United States Patent [19]
Oda

[11] Patent Number: 6,034,369
[45] Date of Patent: Mar. 7, 2000

[54] THERMAL INFRARED DETECTING DEVICE CAPABLE OF DETECTING INFRARED RAYS WITHOUT INFLUENCE OF OPERATING TEMPERATURE

[75] Inventor: Naoki Oda, Tokyo, Japan

[73] Assignee: NEC Corporation, Tokyo, Japan

[21] Appl. No.: 08/979,814

[22] Filed: Nov. 26, 1997

[30] Foreign Application Priority Data

Nov. 27, 1996 [JP] Japan ..................................... 8-315985

[51] Int. Cl.⁷ ...................................................... G01J 5/20
[52] U.S. Cl. ..................... 250/338.1; 250/338.3
[58] Field of Search ............................ 258/338.1, 338.3, 258/338.4, 339.01, 339.02, 339.04, 332

[56] References Cited

U.S. PATENT DOCUMENTS

| | | | |
|---|---|---|---|
| 3,619,614 | 11/1971 | Yamaka | 250/352 |
| 4,966,037 | 10/1990 | Sumner et al. | |
| 5,079,420 | 1/1992 | Turnbull | 250/338.3 |
| 5,286,976 | 2/1994 | Cole | 250/349 |
| 5,640,013 | 6/1997 | Ishikawa et al. | 250/338.4 |
| 5,656,816 | 8/1997 | Tanaka | 250/339.01 |

FOREIGN PATENT DOCUMENTS

| | | | |
|---|---|---|---|
| 58-66028 | 4/1983 | Japan . | |
| 7-120306 | 5/1995 | Japan . | |
| 7-209089 | 8/1995 | Japan . | |
| 7-273306 | 10/1995 | Japan | 250/338.4 |
| 9401743 | 1/1994 | WIPO . | |
| 9621248 | 7/1996 | WIPO . | |

OTHER PUBLICATIONS

Kanno et al., "Uncooled Infrared Focal Plane Array Having 128 x 128 Thermopile Detector Elements" SPIE vol. 2269, pp. 450–459, Jun. 1994.

Ueno et al, "Monolithic Uncooled Infrared Image Sensor with 160 x 120 Pixels", Jul. 1995, pp. 636–643, SPIE vol. 2552.

*Primary Examiner*—Constantine Hannaher
*Assistant Examiner*—Albert Gagliardi
*Attorney, Agent, or Firm*—Hayes Soloway Hennessey Grossman & Hage PC

[57] ABSTRACT

In a thermal infrared detecting device for detecting infrared rays having a specific wavelength, a first pixel (501) has an infrared absorber (544) and a first reflecting film (533) which have a first surface and a second surface, respectively. The first surface and the second surface are remoted from each other by a first distance equal to $\{\lambda*(2m-1)/4*n1\}$, where $\lambda$ is representative of the specific wavelength; m, a natural number; and n1, a practical refractive index between the infrared absorber and the first reflecting film. The infrared absorber is included in a first upper portion (503) together with a first thermo-resistive converter (542). The first reflecting film is formed on a first lower portion which is distant from the first upper portion. A second pixel (502) has a second upper portion (504) which is located in parallel with the first upper portion and which has a second thermo-resistive converter (542). The second pixel has a second lower portion which is extended from the first lower portion and which is distant from the second upper portion.

16 Claims, 7 Drawing Sheets

THERMAL INFRARED DETECTING DEVICE CAPABLE OF DETECTING INFRARED RAYS WITHOUT INFLUENCE OF OPERATING TEMPERATURE

BACKGROUND OF THE INVENTION

This invention relates to a thermal infrared detecting device which detects infrared rays.

Generally, a bolometer type, a pyroelectric type, and a thermocouple (or thermopile) type are known as a thermal infrared detecting element. The thermal infrared detecting element is used as a thermal infrared detecting device singly or together with other thermal infrared detecting elements. For example, a plurality of the thermal infrared detecting elements is used as an array sensor. The array sensor is combined with an optical unit, an amplifying unit, a signal processing unit, a displaying unit etc. to form an infrared imaging device.

The bolometer type thermal infrared detecting element has an infrared absorber, a thermo-resistive converter, and a readout circuit. In this device, the infrared absorber is irradiated by infrared rays which are focused by the optical unit. The infrared absorber absorbs the infrared rays and increases its temperature. This effects a temperature change of the thermo-resistive converter. The thermo-resistive converter changes its resistance with the temperature change. If the thermo-resistive converter is supplied with a predetermined current, a predetermined voltage is been across it. The voltage changes together with the change of the resistance. Namely, the voltage changes with the temperature change which depends on strength of the infrared rays. The readout circuit produces an output signal by the use of the voltage occurred across the thermo-resistive converter.

Therefore, the thermal infrared detecting element can detects the infrared rays and produces the output signal which is representative of the strength of the infrared rays.

However, the thermal infrared detecting element is easily influenced by its operating temperature which is influenced by surrounding temperature. In other words, the output signal includes a drift which depends on the operating temperature.

In order to remove the drift from the output signal, a light chopper is generally combined with the thermal infrared detecting element.

The light chopper chops the infrared rays and intermittently supplies them to the thermal infrared detecting element. As a result, the thermal infrared detecting element produces an alternating signal having an amplitude which is representative of the strength of the infrared rays. Namely, the drift is easily removed from the output signal by removing direct-current component from the output signal.

However, the light chopper is not reliable, and consumes power, because the light chopper needs a motor.

In this field, there have been proposals to solve the above mentioned problems. These proposals provides thermal infrared detecting devices each of which has a pair of the thermal infrared detecting elements (or pixels). One is sensitive to the infrared rays and the other is insensitive to the infrared rays. Each of the thermal infrared detecting devices ideally produces an output signal without the drift by the use of difference between electric characteristics of the sensitive and the insensitive elements.

However, these thermal infrared detecting devices suffer from the following drawbacks.

For example, it is difficult to manufacture. In addition, the thermal infrared detecting device is not sensitive enough to infrared rays. Moreover, it is difficult to completely remove the drift from the output signal.

SUMMARY OF THE INVENTION

It is therefore an object of this invention to provide a thermal infrared detecting device which can correctly detect strength of infrared rays without drift.

It is therefore another object of this invention to provide a thermal infrared detecting device which is highly sensitive to infrared rays.

It is therefore still another object of this invention to provide a thermal infrared detecting device which can be made easily and cheap.

Other objects of this invention will become clear as the description proceeds.

In order to understand the gist of this invention, it should be noted that a thermal infrared detecting device detects infrared rays which have a specific wavelength.

According to an aspect of this invention, the thermal infrared detecting device comprises a first pixel having a first upper portion and a first lower portion which is distant from the said first upper portion. The first upper portion has a first thermo-resistive converter and an infrared absorber which has a first surface while the first lower portion has a first reflecting film having a second surface which faces the first upper portion. The first surface and the second surface are separated from each other by a first distance which is equal to $\{\lambda*(2m-1)/4*n1\}$ through a spacing left between the first upper portion and the first lower portion, where $\lambda$ is representative of the specific wavelength; m, is a natural number; and n1, is a practical refractive index between the first surface and the second surface. A second pixel has a second upper portion which is located in parallel with the first upper portion and which has a second thermo-resistive converter. The second pixel has a second lower portion which is extended from the first lower portion and which is distant from said second upper portion.

DESCRIPTION OF THE PREFERRED EMBODIMENTS

Figure 1A:
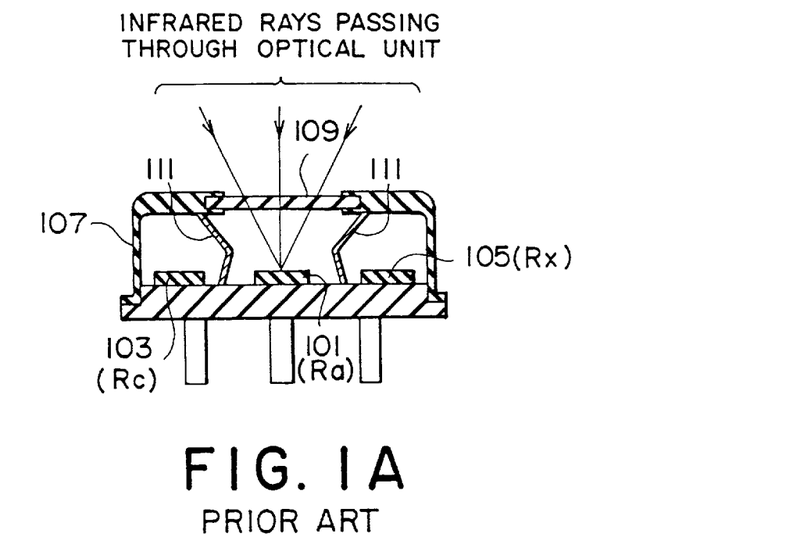
FIG. 1A shows a sectional view of a conventional thermal infrared detecting device.
Figure 1B:
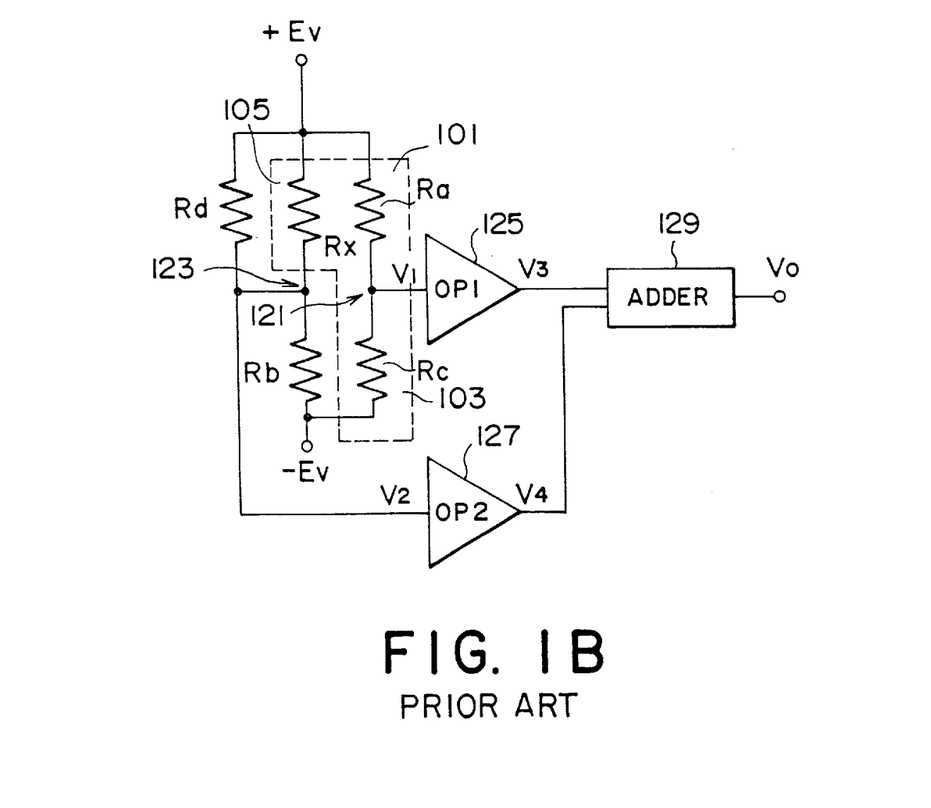
FIG. 1B is a circuit diagram of an infrared detecting circuit using the thermal infrared detecting device of FIG. 1A.

Referring to FIGS. 1A and 1B, description will be at first directed to a conventional thermal infrared detecting device for a better understanding of this invention.

In FIG. 1A, the conventional thermal infrared detecting device has three thermistor bolometer type elements 101 (Ra), 103 (Rc), and 105 (Rx) which are put in a airtight package 107. The airtight package 107 has a window 109 that infrared rays passes through and shields 111 which shield the thermistor bolometer type elements 103 and 105 from the infrared rays. The thermistor bolometer type element 101 is irradiated by the infrared rays which pass through both an optical unit (not shown) and the window 109.

The thermal infrared detecting device is used in an infrared detecting circuit which is shown in FIG. 1B. In FIG. 1B, the thermistor bolometer type elements 101, 103, and 105 are used as a detecting resistor Ra, a load resistor Rc, and a temperature compensating resistor Rx, respectively. The detecting resistor Ra and the load resistor Rc are connected to each other in series at a first junction point 121. The temperature compensating resistor Rx is connected to a first external resistor Rb in series at a second junction point 123. The combination of the detecting resistor Ra and the load resistor Rc is connected to the combination of the temperature compensating resistor Rx and the first external resistor Rb in parallel and is supplied with bias voltage of 2*Ev (i.e. +Ev and −Ev). The combination of the detecting resistor Ra and the load resistor Rc divides the bias voltage of 2*Ev and supplies a first divided voltage V1 to the first junction point 121. Similarly, the combination of the temperature compensating resistor Rx and the first external resistor Rb divides the voltage of 2*Ev and supplies a second divided voltage V2 to the second junction point 123.

A first operational amplifier 125 (OP1) has a noninverse (or inverse) input terminal which is connected to the first junction point 121 to amplify the first divided voltage V1 into a first amplified voltage V3. A second operational amplifier 127 (OP2) has an inverse (or noninverse) input terminal which is connected to the second junction point 123 to amplify the second divided voltage V2 into a second amplified voltage V4.

An adder 129 is connected to the first and the second operational amplifier 125 and 127 and adds the first amplified voltage V3 to the second amplified voltage V4 to produce an added voltage Vo without drift which depends on operating temperature.

A second external resistor Rd is connected to the temperature compensating resistor 105 in parallel to facilitate adjustment of an offset between the first divided voltage V1 and the second divided voltage V2.

As mentioned above, the conventional thermal infrared detecting device can be produce the added voltage Vo without the drift. Such a conventional thermal infrared detecting device is disclosed in Japanese Patent Unexamined Publication No. 66028/1983.

However, the conventional thermal infrared detecting device has a disadvantage of difficulty in manufacturing. Namely, it is difficult to mount the shields 111 to the package 107 without a gap. The gap allows the infrared rays to irradiate the thermistor bolometer type elements 103 and 105 and deteriorates detecting sensitivity of the infrared rays. In addition, the conventional thermal infrared detecting device has another disadvantage of difficulty in integrating.

Figure 2A:
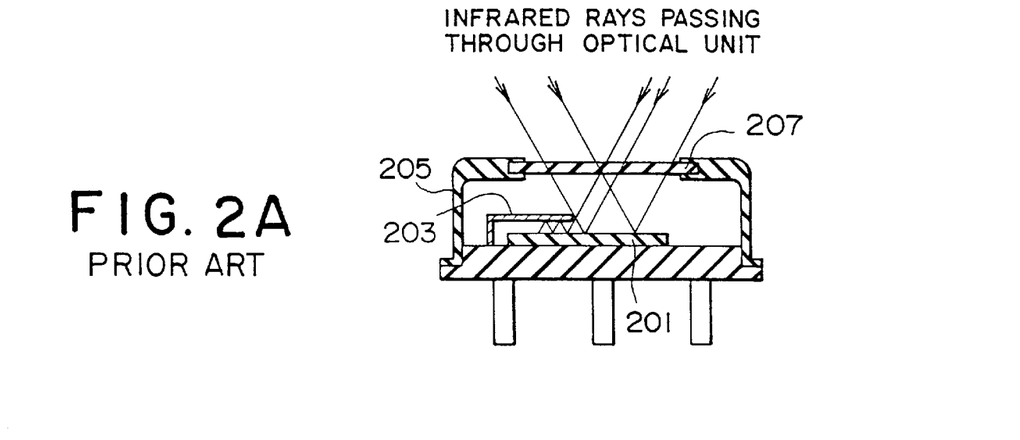
FIG. 2A shows a sectional view of another conventional thermal infrared detecting device.
Figure 2B:
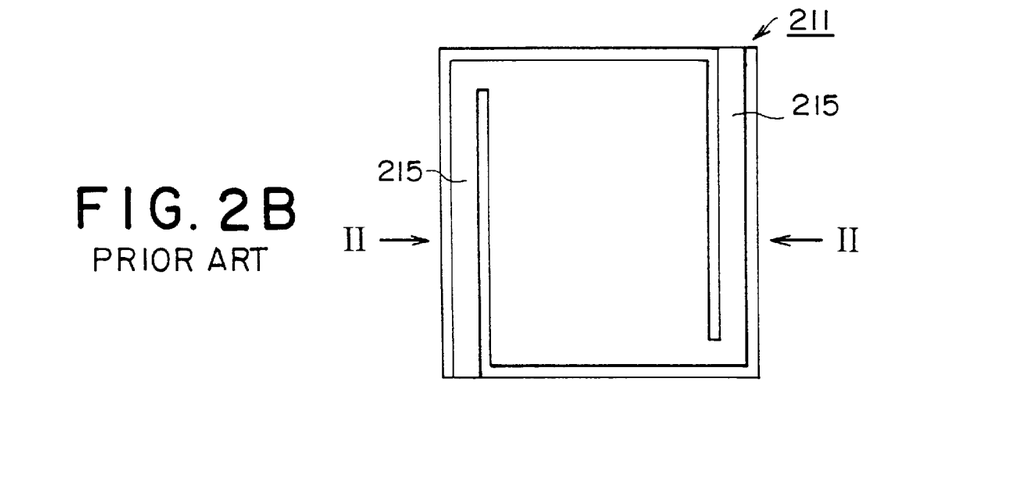
FIG. 2B shows a top view of a thermal infrared detecting element included in the conventional thermal infrared detecting device of FIG. 2A.
Figure 2C:
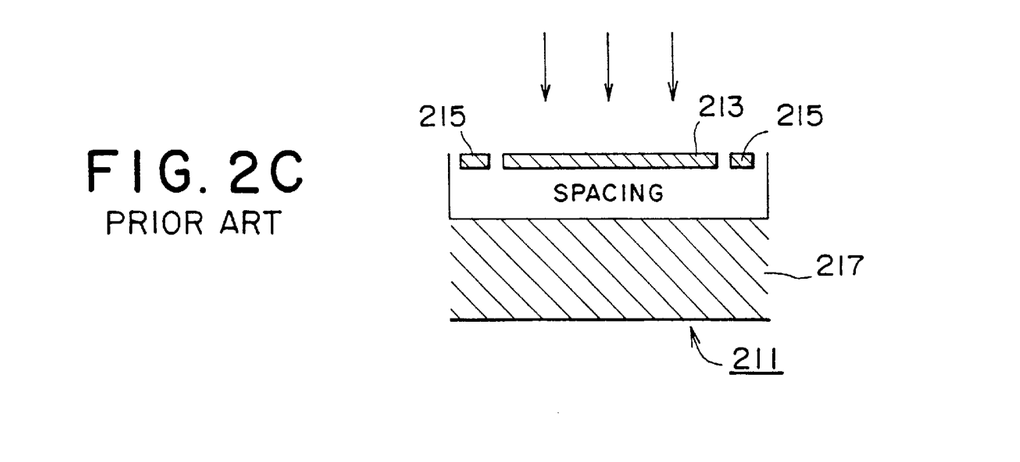
FIG. 2C shows a II—II line sectional view of the thermal infrared detecting element of FIG. 2B.

Referring to FIGS. 2A, 2B, and 2C, description will be made about another conventional thermal infrared detecting device.

In FIG. 2A, the conventional thermal infrared detecting device has a thermal infrared detecting array sensor 201 and a shield 203 both of which are put in airtight package 205. The thermal infrared detecting array sensor 201 has a plurality of thermal infrared detecting elements. The shield 203 covers part of the thermal infrared detecting elements at a distance. Infrared rays passing through a window 207 does not irradiate the part of the thermal infrared detecting elements and irradiate the remaining part of the thermal infrared detecting elements.

Turning to FIGS. 2B and 2C, each of the thermal infrared detecting elements 211 has a diaphragm 213 as a receiving section and a pair of beams 215 each of which is extended from the diaphragm 213 to keep the diaphragm 213 away from a substrate 217 including a read out circuit (not shown). The diaphragm 213 and the substrate 217 decides a spacing between them. This structure is called as a thermal isolation structure and increase detecting sensitivity of the thermal infrared detecting element.

If the thermal infrared detecting element is a bolometer type, the diaphragm 213 has a thermo-resistive converting film and a pair of electrodes which are connected to the thermo-resistive converting film. Moreover, each of the beams 215 has a wiring line which is connected to each of the electrodes.

If the thermal infrared detecting element is irradiated by the infrared rays, it absorbs the infrared rays by the diaphragm 213 and increases its temperature. The thermo-resistive converting film changes its resistance with the temperature change. The readout circuit detects the change of the resistance and provides a first detecting signal which is representative of the resistance change.

On the other hand, if the thermal infrared detecting element is covered with the shield 203 of FIG. 2A, the infrared rays do not irradiate it and the readout circuit produces a second detecting signal which depends on its operating temperature. Because the second detecting signal is equivalent to drift which is included in the first detecting signal, a difference between the first detecting signal and the second detecting signal does not includes the drift. Namely, drift can be removed from the first detecting signal by the use of the second detecting signal.

It is easily understood from above description that the array sensor 201 produces an output signal without the drift by the use of the part of the thermal infrared detecting elements and the remaining part of the thermal infrared detecting elements.

The thermal infrared detecting elements irradiated by the infrared rays and the other elements must have a common thermal conductance in order to completely remove the drift. Therefore, the shield 203 is not in contact with the array sensor 201.

As mentioned above, the thermal infrared detecting device can remove the drift which depends on the operation temperature. However, the thermal infrared detecting device has a disadvantage of deterioration of detecting sensitivity to the infrared rays. This is because a part of the infrared rays enter the space between the array sensor and the shield as shown in FIG. 2A.

Figure 3:
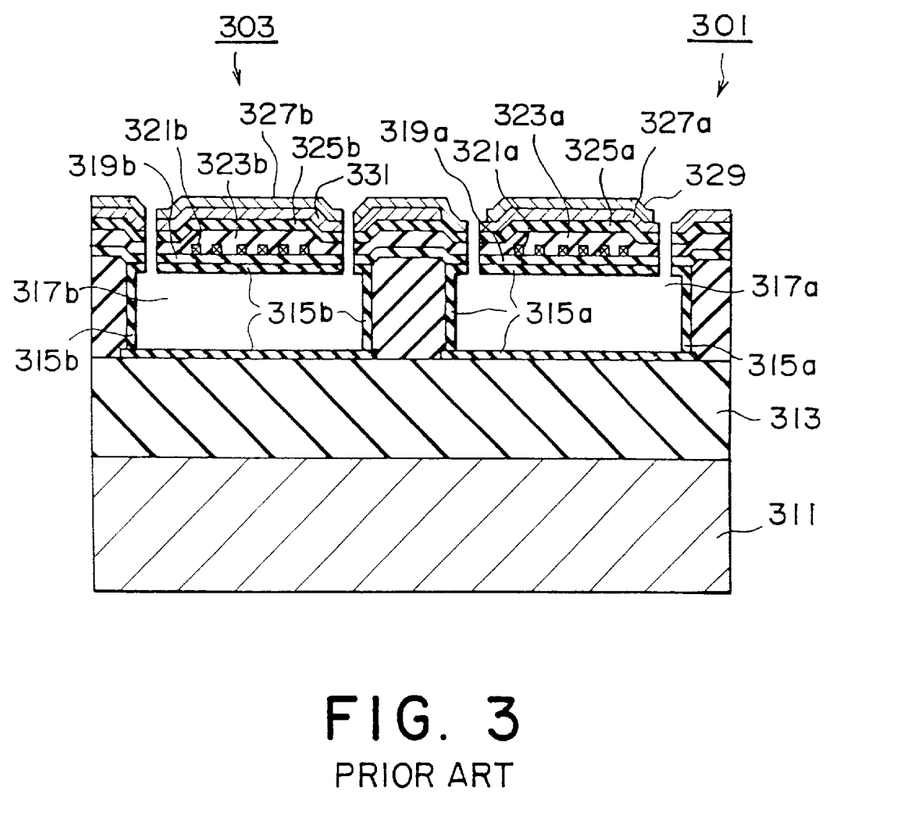
FIG. 3 shows a sectional view of a still another conventional thermal infrared detecting device.

Referring to FIG. 3, description will be made about still another conventional thermal infrared detecting device.

The thermal infrared detecting device is a thermocouple type and has a thermal infrared detecting element 301 and a reference level detecting element 303. The thermal infrared detecting element 301 and the reference level detecting element 303 has a common silicon substrate 311 with a integrated circuit (or readout circuit, not shown) and a common BPSG film 313 formed on the silicon substrate 311.

The thermal infrared detecting element 301 has a silicon nitride film 315a which defines a space 317a. A silicon dioxide film 319a is formed on a top surface of the silicon nitride film 315a to form a first diaphragm. A thermopile 321a is formed on the silicon dioxide film 319a and is covered with a first layer insulating film 323a. A second layer insulating film 325a is formed on the first layer insulating film 323a to cover wiring lines (not shown) which are connected between the integrated circuit and the thermopile 321a. A protection film 327a is formed on the second layer insulating film 325a. An infrared absorbing film 329 is formed on the protection film 327a.

The reference level detecting element 303 has a silicon nitride film 315b which defines a space 317b. A silicon dioxide film 319b is formed on a top surface of the silicon nitride film 315b to form a second diaphragm. A thermopile 321b is formed on the silicon nitride film 319b and is covered with a first layer insulating film 323b. A second layer insulating film 325b is formed on the first layer insulating film 323b to cover wiring lines (not shown) which are connected between the integrated circuit and the thermopile 321b. A shielding film 331 is formed on the second layer insulating film 325b. A protection film 327b is formed on the shielding film 331.

The reference level detecting element 303 has a thermal conductance which is equal to a thermal conductance of the thermal infrared detecting element 301. Moreover, the thermal infrared detecting element 301 has the infrared absorbing film 329 while the reference level detecting element 303 has the shielding film 331. Accordingly, the reference level detecting element 303 produces a reference level signal which is equal to a drift included in a detected signal produced by the thermal infrared detecting element 301. Therefore, the thermal infrared detecting device calculates a difference between the detected signal and the reference level signal and produces an output signal without the drift.

However, the thermal infrared detecting device has a problem that the films formed on each of the first and the second diaphragms is thick and heavy. This brings increase of thermal capacity and deterioration of thermal response and makes the diaphragms transform. In addition, the thermal infrared detecting device has another problem that the shielding film 331 is injurious to an electrical characteristic of the reference level detecting element.

Figure 4:
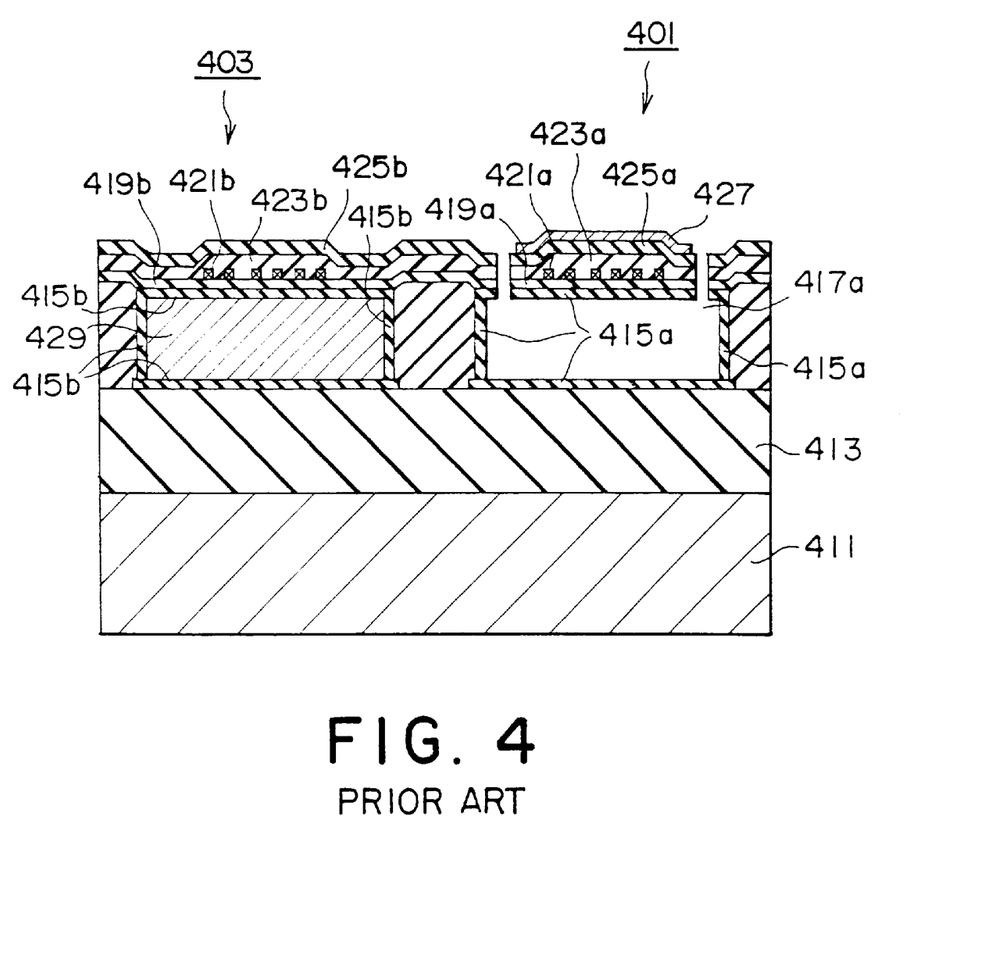
FIG. 4 shows a sectional view of a yet another conventional thermal infrared detecting device.

Then, in order to solve the problems, a thermal infrared detecting device illustrated in FIG. 4 is proposed in Japanese Patent Unexamined Publication No. 273306/1995. In addition, similar devices are disclosed in papers of SPIE vol. 2552, 1995, P.636–643 and SPIE vol. 2269, Infrared Technology XX, 1994, P.450–459.

In FIG. 4, the thermal infrared detecting device has a thermal infrared detecting element 401 and a reference level detecting element 403. The thermal infrared detecting element 401 and the reference level detecting element 403 has a common silicon substrate 411 with a integrated circuit (not shown) and a common BPSG film 413 formed on the silicon substrate 411.

The thermal infrared detecting element 401 has a silicon nitride film 415a which defines a space 417a. A silicon dioxide film 419a is formed on a top surface of the silicon nitride film 415a to form a diaphragm. A thermopile 421a is formed on the silicon dioxide film 419a and is covered with a layer insulating film 423a. A protection film 425a is formed on the layer insulating film 423a. An infrared absorbing film 427 is formed on the protection film 425a.

The reference level detecting element 403 has a silicon nitride film 415b. A polysilicon layer 429 is filled in a space defined by the silicon nitride film 415b. A silicon dioxide film 419b is formed on a top surface of the silicon nitride film 415b. A thermopile 421b is formed on the silicon dioxide film 419b and is covered with a layer insulating film 423b. A protection film 425b is formed on the layer insulating film 423b.

Because the thermal infrared detecting element 401 has a thermal isolation structure, its detecting sensitivity to infrared rays is high. On the other hand, the reference level detecting element 403 has little sensitivity to the infrared rays because it has the polysilicon layer 429 and thermal diffusion is easy to occur in the reference level detecting element 403.

The thermal infrared detecting device can remove a drift caused by operation temperature by the use of a difference between thermal characteristics of the thermal infrared detecting element 401 and the reference level detecting element 403.

In this structure, the problems as mentioned above are not caused because the thermal infrared detecting device has neither an additional layer isolation film nor a shielding film.

However, the thermal infrared detecting device can not completely remove the drift. This is because the thermal infrared detecting element 401 and the reference level detecting element 403 have different thermal time constants. Particularly, when the thermal infrared detecting device 401 is driven by voltage pulses to produce an output signal, it can not be disregarded that temperature of each element is increased by Joule's law in an instant.

In addition, though an alloy of nickel (Ni) and chromium (Cr) is given an example of the infrared absorbing film 427 in the Japanese Patent Unexamined Publication No. 273306/1995, it is difficult to control its thickness. The infrared absorbing film 427 must have a resistivity of about 377 ohms/square to efficiently absorb the infrared rays. The resistivity is realized by the alloy of the nickel (Ni) and the chromium (Cr) having a thickness of about 30 angstroms. The thickness is very thin and it is difficult to form with accuracy.

Moreover, it is difficult to reproduce the infrared absorbing film 427 by the alloy of the nickel (Ni) and chromium (Cr) because the resistivity of the alloy of the nickel (Ni) and chromium(Cr) is easily changed by a condition of surfaces of just under film and itself.

On the other hand, a gold black layer is given an example of the absorbing film in the paper of SPIE vol. 2269, Infrared Technology XX, 1994, P.450–459. However, the gold black is granular and weak in adhesiveness and in tolerance for chemicals. Namely, the gold black layer can not be selectively etched to form a pattern.

Figure 5A:
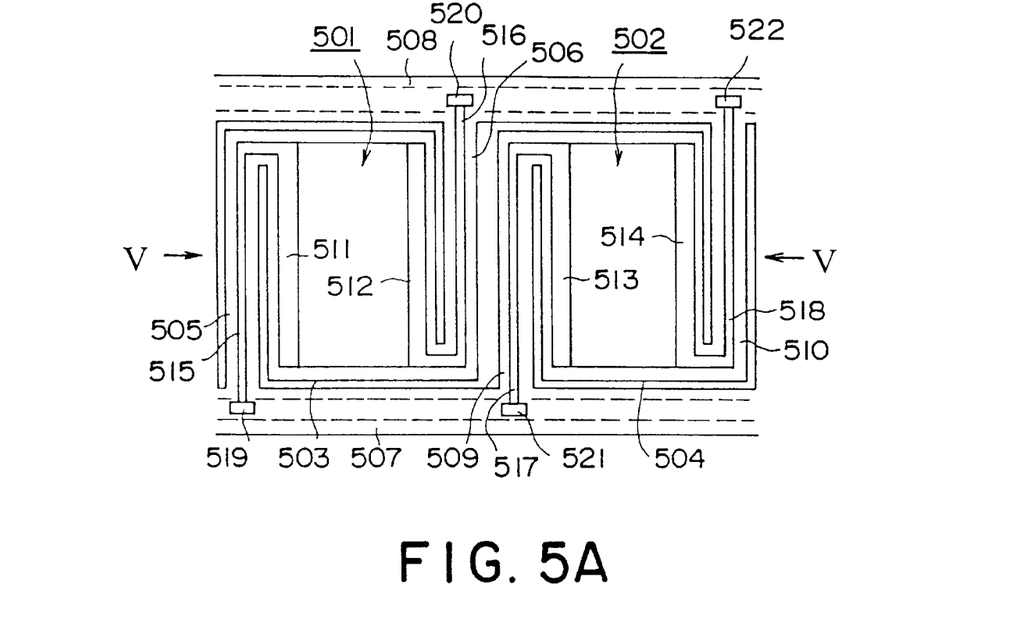
FIG. 5A shows a top view of a thermal infrared detecting device according to a first embodiment of this invention.
Figure 5B:
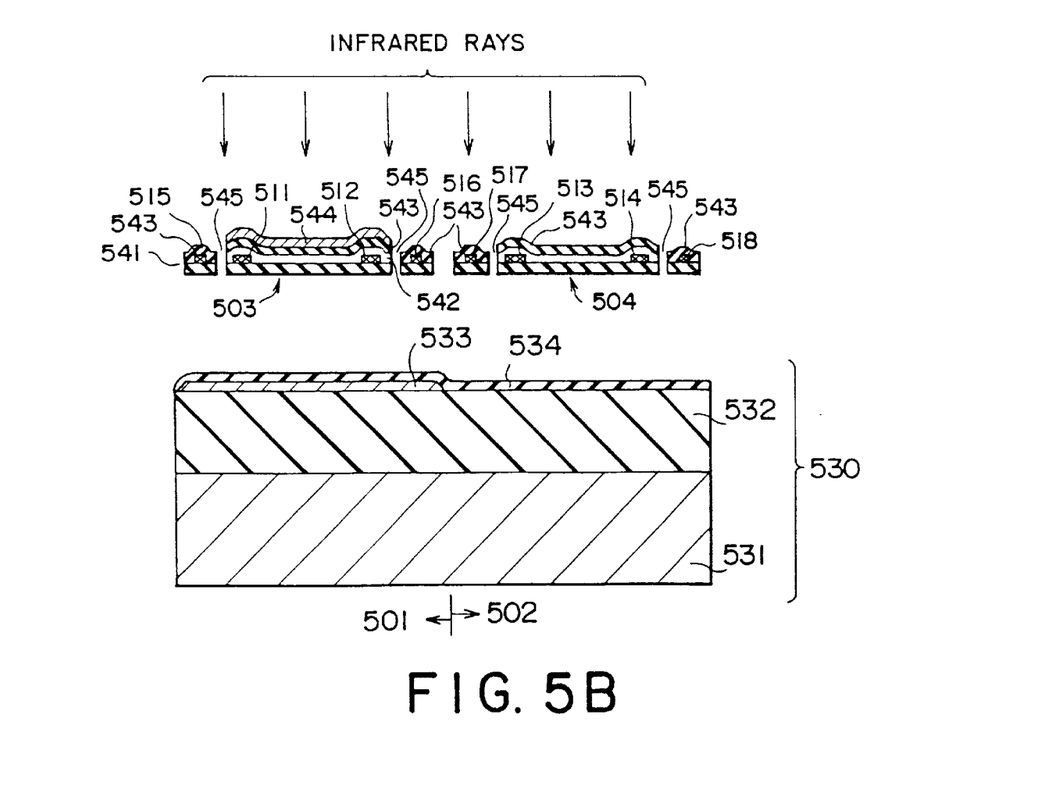
FIG. 5B shows a V—V line sectional view of the thermal infrared detecting device of FIG. 5A at an V—V line.

Referring to FIGS. 5 (A) and 5 (B), description will be made about an infrared detecting device according to a first embodiment of this invention.

In FIG. 5A, an infrared detecting device has first and second pixels (or elements) 501 and 502 which have first and second diaphragms 503 and 504, respectively. The first diaphragm 503 is supported by first and second beams 505 and 506 which are extended from first and second mesas 507 and 508, respectively. Similarly, the second diaphragm 504 is supported by third and fourth beams 509 and 510 which are extended from the first and the second mesas 507 and 508, respectively.

The first diaphragm 503 has first and second electrodes 511 and 512 while the second diaphragm 504 has third and fourth electrodes 513 and 514. The beams 505, 506, 509, and 510 have first, second, third, and fourth wiring lines 515, 516, 517, and 518, respectively. The first wiring line 515 connects the first electrode 511 to a contact 519 formed in the first mesa 507 while the second wiring line 516 connects the second electrode 512 to a contact 520 formed in the second mesa 508. Similarly, the third wiring line 517 connects the third electrode 513 to a contact 521 formed in the first mesa 507 while the fourth wiring line 518 connects the forth electrode 514 to a contact 522 formed in the second mesa 508.

Turning to FIG. 5B, the first and the second diaphragms 503 and 504 are kept away from a lower portion 530 by the beams 505, 506, 509, and 510 and the mesas 507 and 508 (see FIG. 5A). This structure is called as a thermal isolation structure and is formed as follows.

A silicon wafer 531 is prepared to form a readout circuit (not shown). The readout circuit includes MOSFETs which are connected to the contacts 519 and 521 (or 520 and 522) to selectively drive one of the pixels 501 and 502.

A first BPSG (Boron Phosphorus silica glass) film 532 about 1 μm thick is formed on the silicon wafer 531 with the readout circuit by chemical vapor deposition.

A reflecting film 533 about 2000 angstroms thick is formed on the first BPSG film 532 by sputtering first metal material which has a high reflectance to infrared rays. For example, the first metal material is tungsten silicide (WSi), tungsten (W), titanium (Ti), aluminum (Al), aurum (Au), or platinum (Pt). Moreover, the sputtering may be carried out under nitrogen atmosphere to form a titanium nitride (TiN) film as the reflecting film 533. The reflecting film 533 is selectively etched by plasma etching to remove it for the second pixel 502 and to leave it for the first pixel 501.

A protection film 534 is formed on both the reflecting film 533 and exposed surface of the first BPSG film 532 by depressurized chemical vapor deposition. For example, the protection film 534 is a silicon dioxide (SiO2) film or a silicon nitride (SiN) film.

A polysilicon film (not shown) is formed on the protection film 534. The polysilicon film is called a sacrifice layer because it is completely removed and becomes opening as mentioned later. The polysilicon film is selectively etched by lithography technique to leave it on predetermined area of the protection film 534. Another film, such as a silicon dioxide film, a photosensitive polyimide film, photoresist, etc., may be used as the sacrifice layer.

A second BPSG film (not shown) is formed on both the polysilicon film and an exposed surface of the protection film 534 so that its surface becomes flat. The second BPSG film is selectively etched by lithography to expose the polysilicon film. Accordingly, the second BPSG film leaves on the exposed surface of the protection film 534 and is partly used as the mesas 507 and 508.

A supporting film 541 is formed on the polysilicon film and the second BPSG film by plasma chemical vapor deposition. For example, a silicon nitride (SiN) film and/or a silicon dioxide (SiO2) film is used as the supporting film 541.

A metal film is formed on the supporting film 541 by sputtering second metal material having a small thermo-conductivity and is patterned by lithography to form wiring pattern which includes the electrodes 511, 512, 513, and 514 and wiring lines 515, 516, 517, and 518. It is desirable that the second metal material has a low thermo-conductivity and a low resistance. For example, the second metal material is titanium (Ti) or an alloy of nickel (Ni), chromium (Cr), and iron (Fe).

A thermo-resistive converting film (or bolometer film) 542 is formed on the supporting film 541 by reactive sputtering third metal material under oxygen mixed atmosphere so as to cover the wiring pattern. The thermo-resistive converting film 542 is a metal oxide film. When the third metal material is nickel (Ni), cobalt (Co), manganese (Mn), or other metal material, the thermo-resistive converting film 542 has a negative temperature coefficient (NTC). On the other hand, when the third metal material is compound of barium titanate (BaTiO3) and strontium (Sr) or other metal material, the thermo-resistive converting film 542 has a positive temperature coefficient (PTC). The thermo-resistive converting film 542 is patterned by the lithography technique to leave it in both the first diaphragm 503 and in the second diaphragm 504.

An insulation protecting film 543 is formed on the thermo-resistive converting film 542 by plasma chemical vapor deposition. For example, the insulation protecting film 543 is a silicon nitride film or a silicon dioxide film.

An infrared absorbing film 544 is formed on the insulation protecting film 543 by reactive sputtering fourth metal material. The infrared absorbing film 544 is selectively etched to leave it on the first diaphragm 503.

The infrared absorbing film 544 must have a sheet resistance k of about 377 ohms/square to match with vacuum. Moreover, it is difficult to equalize thickness of the infrared absorbing film 544, when the thickness is thinner than 150 angstroms. In addition, it is undesirable that the infrared absorbing film 544 refracts the infrared rays and is not pervious to the infrared rays when the thickness is thicker than 2000 angstroms. Accordingly, it is desirable that the infrared absorbing film 544 has a resistivity ρ of 0.5–10 mΩ cm with a thickness t of 150–2000 angstroms (ρ=k*t). Such condition as mentioned above is satisfied by a titanium nitride (TiN) film, a divanadium trioxide ($V_2O_3$) film, etc. Each of the titanium nitride film and the divanadium trioxide film has strong adhesiveness to a flat surface, high resistivity, high controllability of forming. Particularly, the titanium nitride film has big tolerance for chemicals.

Openings 545 are formed through the insulation protecting film 543 and the supporting film 541 by plasma etching or ion milling to expose the polysilicon film.

The polysilicon film is completely etched by etchant, such as hydrazine. As a result, the first diaphragm 503 and the second diaphragm 504 are distant from the lower portion 530 and form the thermo-isolation structure.

In this structures the infrared absorbing film 544 reflects a part of the infrared rays which irradiate the infrared absorbing film 544. The remaining infrared rays pass through the infrared absorbing film 544. Almost all of the remaining infrared rays pass through the insulation protecting film 543, the thermo-resistive converting film 542, the supporting film 541, and the protection film 534 and arrives at a surface of the reflecting film 533. The reflecting film 533 reflects the infrared rays which arrives at the surface of it. Almost all of the infrared rays reflected by the reflecting film 533 pass through the protection film 534, the supporting film 541, the thermo-resistive converting film 542, and the insulation protecting film 543 and returns to the infrared absorbing film 544.

Here, if the infrared rays reflected by the infrared absorbing film 544 interfere with the infrared rays reflected by the reflecting film 533 so as to weaken each other, the infrared rays reflected by the infrared absorbing film 544 can be disappeared. Consequently, almost all of the infrared rays is absorbed by the infrared absorbing film 544. Then the absorbing film 544 is located as mentioned bellow.

Namely, the surface of the absorbing film 544 and the surface of the reflecting film 533 are remoted from each other by a first optical path distance which is equal to $\{\lambda*(2m-1)/4*n1\}$, where $\lambda$ is representative of a wavelength of the infrared rays, m, a natural number; and n1, a practical refractive index between the surface of the absorbing film 544 and the surface of the reflecting film 533. For example, the first optical path distance is 2.5 $\mu$m when the wavelength of the infrared rays is 10 $\mu$m.

Therefore, the infrared absorbing film 544 can effectively converts the infrared rays into the change of the temperature itself because the infrared rays reflected by the infrared absorbing film 544 is disappeared. Namely, the first diaphragm 503 is sensitive to the infrared rays.

Temperature of the thermo-resistive converting film 542 is raised by the temperature change of the infrared absorbing film 544. Then, the resistance of the thermo-resistive converting film 542 changes in response to the change of the temperature.

On the other hand, the second diaphragm 504 passes almost all of the infrared rays which irradiate it. Accordingly, a resistance of the thermo-resistive converting film 542 in the second diaphragm 504 is hardly influenced by the infrared rays. Namely, the second diaphragm 504 is insensitive to the infrared rays. The resistance depends on operating temperature of the infrared detecting device.

If each of the thermo-resistive converting film 542 of the first diaphragm 503 and the thermo-resistive converting film 542 of the second diaphragm 504 are supplied with a constant current, voltages are occurred across them. A difference of the voltages does not include a drift occurred by the operating temperature.

Moreover, because the first diaphragm 503 and the second diaphragm 504 have the same structure without the infrared absorbing film 544, they essentially have the same thermal time constant. Accordingly, influence caused by bias pulses is removed by the above mentioned structure.

The infrared detecting device is used such that it is put in airtight package. The infrared detecting device may be put in the airtight package with inert gas, such as xenon.

Figure 6:
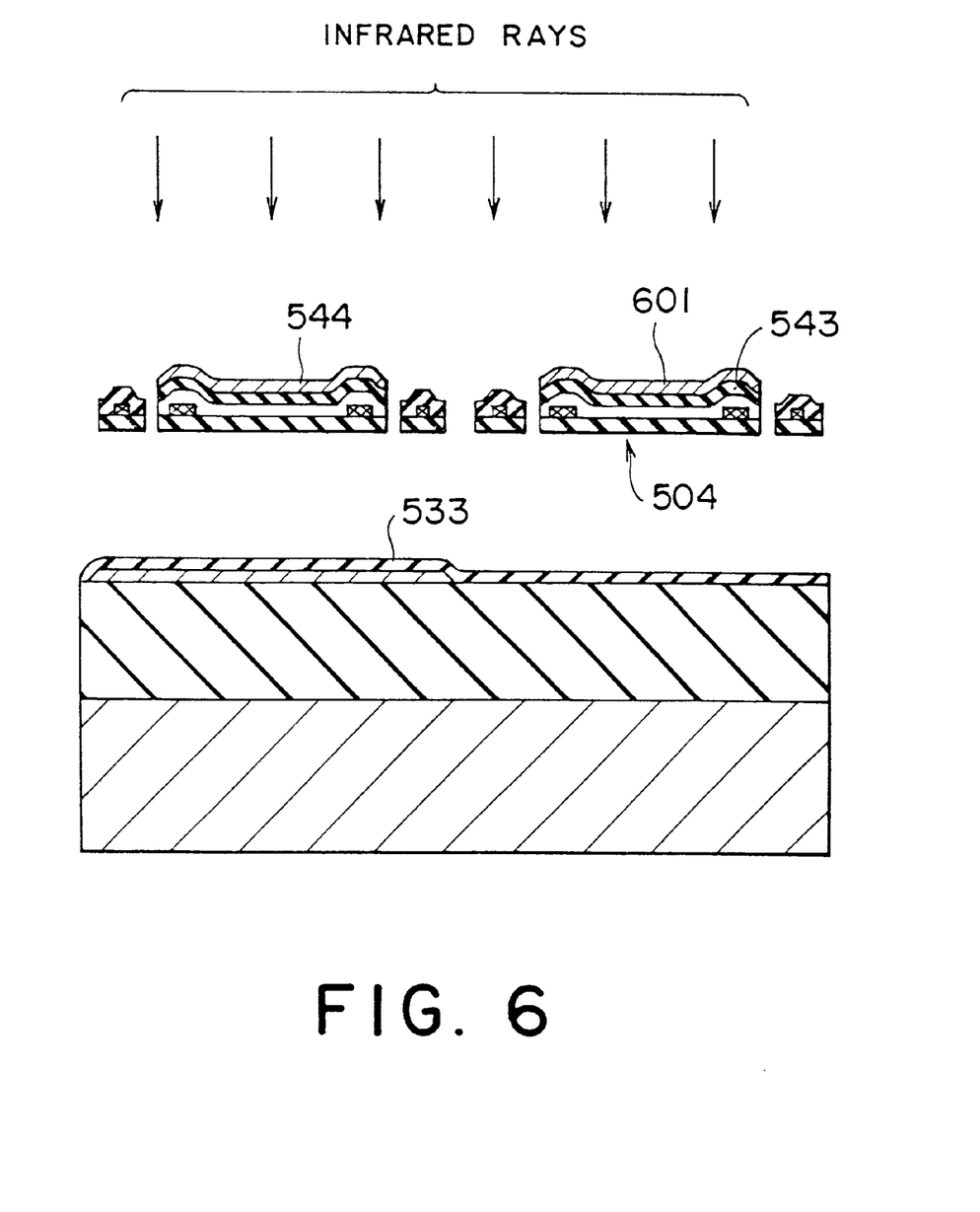
FIG. 6 shows a sectional view of a thermal infrared detecting device according to a second embodiment of this invention.

Referring to FIG. 6, description will be made about an infrared detecting device according to a second embodiment of this invention.

In FIG. 6, a reflecting film 601 is formed on the insulation protecting film 543 at a top of the second diaphragm 504. The reflecting film 601 is much thicker than the infrared absorbing film 544. A sheet resistance of the reflecting film 601 is smaller than a sheet resistance of the infrared absorbing film 544. For example, the reflecting film 601 is a titanium film 2000 angstroms thick when the infrared absorbing film 544 is a titanium nitride 150 angstroms thick. The reflecting film 601 completely reflects the infrared rays irradiating it.

In this structure, the reflecting film 533 may be extended under the second diaphragm 504.

The reflecting film 601 does not almost change the thermo time constant of the second diaphragm 504, because it is much smaller than the infrared absorbing film 544 in weight. Namely, the infrared detecting device can detect the infrared rays without influence of the change of the operating temperature.

Figure 7:
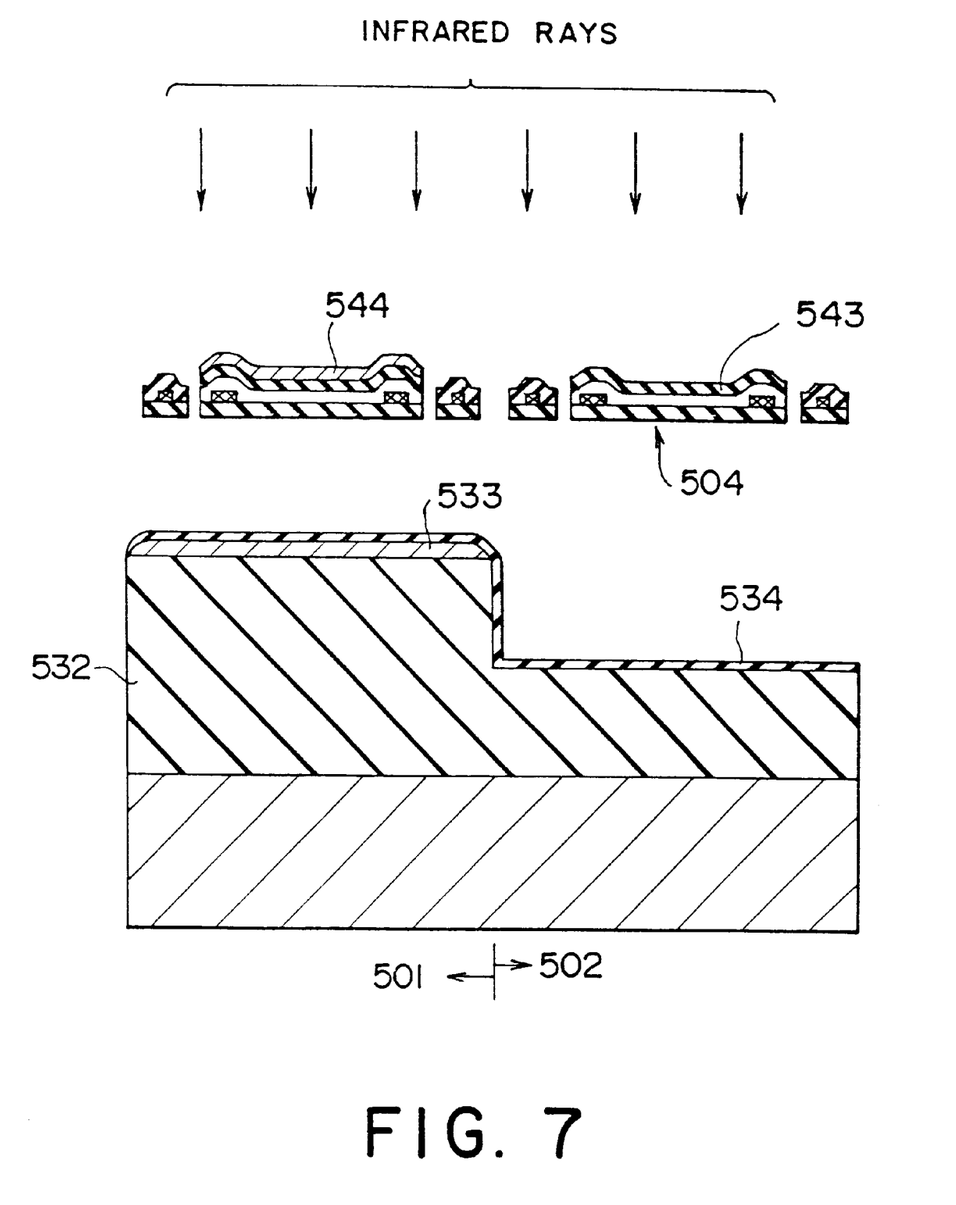
FIG. 7 shows a sectional view of a thermal infrared detecting device according to a third embodiment of this invention.

Referring to FIG. 7, description will be made about an infrared detecting device according to a third embodiment of this invention.

In FIG. 7, the BPSG film 532 has a step between the first pixel 501 and the second pixel 502. In the first pixel 501, the thickness of the BPSG film 532 is decided by the first optical path distance. On the other hand, the thickness of the BPSG film 532 in the second pixel 502 is decided by a second distance as mentioned bellow.

If the infrared rays reflected by a surface of the insulation protecting film 543 at the second diaphragm 504 has a phase which is equal to a phase of the infrared rays reflected by a surface of the protection film 534, the infrared rays reflected by the surface of the insulation protecting film 543 are the strongest. Then the second distance is equal to $\{\lambda*m/2*n2\}$, where $\lambda$ is representative of the wavelength of the infrared rays, m; natural number, and n2; a practical refractive index between the surface of the insulation protecting film 543 and the surface of the protection film 534.

In this structure, the second diaphragm 504 is almost insensitive to the infrared rays even though the second pixel 502 has at least one of the reflecting film 533 and the infrared absorbing film 544 like the first pixel 501. Accordingly, the infrared detecting device may has the reflecting film 533 and the infrared absorbing film 544 in the second pixel 504. Moreover, the infrared detecting device may has the reflecting film 601 as shown in FIG. 6. The reflecting film 533 may be extended to the second pixel 502.

While this invention has thus far been described in conjunction with embodiments thereof, it will be readily possible for those skilled in the art to put this invention into practice in various other manners.

For example, the thermal infrared detecting device may have more than three pixels. In this case, one is the second pixel and the others are the first pixels in each row (or column).

What is claimed is:

1. A thermal infrared detecting device for detecting infrared rays having a specific wavelength, said thermal infrared detecting device comprising:

a first pixel having a first upper portion and a first lower portion which is distant from said first upper portion, said first upper portion having a first thermo-resistive converter and an infrared absorber which has a first surface while said first lower portion having a first reflecting film which has a second surface facing said first upper portion, said first surface and said second surface being remoted from each other by a first distance equal to ($\lambda*(2m-1)/4*n1$) through a first spacing left between the first upper portion and the first lower portion, where $\lambda$ is representative of said specific wavelength; m, a natural number; and n1, a practical refractive index between said infrared absorber and said first reflecting film, wherein said first pixel being sensitive to infrared rays and wherein a resistance of said thermo-resistive converter changes in response to a temperature change of said infrared absorber; and a second pixel having a second upper portion which is located in parallel with said first upper portion and which has a second thermo-resistive converter having a second lower portion which is extended from said first lower portion and which is distant from said second upper portion, wherein said second upper portion and said second lower portion are remoted from each other by a second distance equal to $\lambda*m)/2*n2$) through a second spacing left between the second upper portion and the second lower portion, where $\lambda$ is representative of said specific wavelength; m, a natural number; and n2, a practical refractive index between a top of said second upper portion and a top of said second lower portion, wherein said second pixel being insensitive to infrared rays.

2. A thermal infrared detecting device as claimed in claim 1, wherein said thermal infrared detecting device further comprises a supporting member for supporting said first upper portion and said second upper portion above said first lower portion and said second lower portion, respectively.

3. A thermal infrared detecting device as claimed in claim 1, wherein said thermal infrared detecting device further comprises a readout circuit which is formed in both said first lower portion and said second lower portion and is electrically connected to said first thermo-resistive converter and said second thermo-resistive converter.

4. A thermal infrared detecting device as claimed in claim 1, wherein said thermal infrared detecting device further comprises a second reflecting film formed on a top surface of said second upper portion.

5. A thermal infrared detecting device as claimed in claim 1, wherein each of said first thermo-resistive converter and said second thermo-resistive converter is a bolometric film.

6. A thermal infrared detecting device as claimed in claim 1, wherein said infrared absorber has thickness of 150–2000 angstroms and resistivity of 0.3–10 m$\Omega$ cm.

7. A thermal infrared detecting device as claimed in claim 6, wherein said infrared absorber is a titanium nitride (TiN) film.

8. A thermal infrared detecting device as claimed in claim 6, wherein said infrared absorber is a divanadium trioxide ($V_2O_3$) film.

9. A thermal infrared detecting device for detecting infrared rays having a specific wavelength, said thermal infrared detecting device comprising:

a first pixel having a first upper portion and a first lower portion which is distant from said first upper portion, said first upper portion having a first thermo-resistive converter and an infrared absorber which has a first surface while said first lower portion having a first reflecting film which has a second surface facing said first upper portion, said first surface and said second surface being remoted from each other by a first distance equal to ($\lambda*(2m-1)/4*n1$) through a first spacing left between the first upper portion and the first lower portion, where $\lambda$ is representative of said specific wavelength; m, a natural number; and n1, a practical refractive index between said infrared absorber and said first reflecting film; and a second pixel having a second upper portion which is located in parallel with said first upper portion and which has a second thermo-resistive converter and having a second lower portion which is extended from said first lower portion and which is distant from said second upper portion, said second upper portion having a third surface, said second lower portion having a fourth surface, wherein said third surface and said fourth surface are remoted from each other by a second distance equal to ($\lambda*m)/2*n2$) through a second spacing left between the second upper portion and the second lower portion, where $\lambda$ is representative of said specific wavelength; m, a natural number; and n2, a practical refractive index between a top of said second upper portion and a top of said second lower portion.

10. A thermal infrared detecting device as claimed in claim 9, wherein said thermal infrared detecting device further comprises a supporting member for supporting said first upper portion and said second upper portion above said first lower portion and said second lower portion, respectively.

11. A thermal infrared detecting device as claimed in claim 9, wherein said thermal infrared detecting device further comprises a readout circuit which is formed in both said first lower portion and said second lower portion and is electrically connected to said first thermo-resistive converter and said second thermo-resistive converter.

12. A thermal infrared detecting device as claimed in claim 9, wherein said thermal infrared detecting device further comprises a second reflecting film formed on a top surface of said second upper portion.

13. A thermal infrared detecting device as claimed in claim 9, wherein each of said first thermo-resistive converter and said second thermo-resistive converter is a bolometric film.

14. A thermal infrared detecting device as claimed in claim 9, wherein said infrared absorber has thickness of 150–2000 angstroms and a resistivity of 0.3–10 m$\Omega$ cm.

15. A thermal infrared detecting device as claimed in claim 14, wherein said infrared absorber is a titanium nitride (TiN) film.

16. A thermal infrared detecting device as claimed in claim 14, wherein said infrared absorber is a divanadium trioxide ($V_2O_3$) film.

* * * * *